(12) United States Patent
Watanabe

(10) Patent No.: US 9,174,675 B2
(45) Date of Patent: Nov. 3, 2015

(54) STEERING APPARATUS AND CONTROL METHOD THEREOF

(71) Applicant: Ryouchi Watanabe, Susono (JP)

(72) Inventor: Ryouchi Watanabe, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/076,726

(22) Filed: Nov. 11, 2013

(65) Prior Publication Data

US 2014/0136053 A1 May 15, 2014

(30) Foreign Application Priority Data

Nov. 12, 2012 (JP) ................................. 2012-248721

(51) Int. Cl.
*B62D 5/04* (2006.01)
*B62D 15/02* (2006.01)

(52) U.S. Cl.
CPC ................................. *B62D 15/0245* (2013.01)

(58) Field of Classification Search
CPC .. B62D 15/0245; B62D 6/003; B62D 15/025;
B62D 6/00; B62D 15/02; B62D 15/0285;
B62D 5/0457; B62D 5/0463; B62D 5/0481;
B62D 5/049; B60T 2230/02; B60T 2270/86;
B60T 8/1755; B60T 2201/10; B60T 2210/12;
B60T 8/17552; B60T 8/885; B60T 2201/087;
B60T 2250/062; B60W 10/20; B60W
2050/0088; B60W 2050/0215; B60W
2520/125; B60W 2520/20; B60W 30/12;
B60W 40/064; B60W 40/10; B60W 10/12

USPC .................. 701/1, 36, 41, 42, 70, 71, 45, 46;
180/401, 402, 410, 411, 422, 423

See application file for complete search history.

(56) References Cited

U.S. PATENT DOCUMENTS

| | | | | |
|---|---|---|---|---|
| 5,122,955 | A * | 6/1992 | Ishikawa et al. | 701/43 |
| 6,314,329 | B1 * | 11/2001 | Madau et al. | 700/89 |
| 8,090,503 | B2 * | 1/2012 | Lavoie et al. | 701/42 |
| 2003/0109939 | A1 * | 6/2003 | Burgdorf et al. | 700/38 |
| 2004/0093140 | A1 * | 5/2004 | Inagaki | 701/41 |
| 2006/0131096 | A1 * | 6/2006 | Ono et al. | 180/400 |
| 2006/0200289 | A1 * | 9/2006 | Chino et al. | 701/41 |

(Continued)

FOREIGN PATENT DOCUMENTS

JP 2004-276734 A 10/2004
WO 2013175790 A1 11/2013

*Primary Examiner* — John R Olszewski
*Assistant Examiner* — Truc M Do
(74) *Attorney, Agent, or Firm* — Dinsmore & Shohl LLP

(57) ABSTRACT

A steering apparatus includes a history holding unit recording a zero point maximum value and a zero point minimum value of a steering angle of a steering wheel, a precursor determination unit, and a characteristic variation determination unit. The history holding unit cancels the recorded zero point maximum value and the recorded zero point minimum value respectively, when a predetermined period elapses following the update of the recorded value. When the precursor determination unit determines that the system is in a precursory condition to characteristic variation, the characteristic variation determination unit determines whether or not characteristic variation has occurred in the steering transmission system on the basis of at least one of an amount of increase in the zero point maximum value and an amount of decrease in the zero point minimum value following a point at which the system is determined to be in the precursory condition.

6 Claims, 9 Drawing Sheets

(56) References Cited

U.S. PATENT DOCUMENTS

| | | | |
|---|---|---|---|
| 2008/0027601 A1* | 1/2008 | Sewaki | 701/29 |
| 2008/0119986 A1* | 5/2008 | Wei et al. | 701/41 |
| 2008/0249685 A1* | 10/2008 | Hara et al. | 701/42 |
| 2008/0281490 A1* | 11/2008 | Wittig | 701/41 |
| 2009/0171526 A1* | 7/2009 | Takenaka et al. | 701/29 |
| 2009/0240389 A1* | 9/2009 | Nomura et al. | 701/29 |
| 2009/0319114 A1* | 12/2009 | Takenaka et al. | 701/29 |
| 2010/0030428 A1* | 2/2010 | Gartner | 701/42 |
| 2010/0250069 A1* | 9/2010 | Murty et al. | 701/42 |
| 2011/0035097 A1* | 2/2011 | Lewis | 701/36 |
| 2012/0173040 A1* | 7/2012 | Yokota | 701/1 |

* cited by examiner

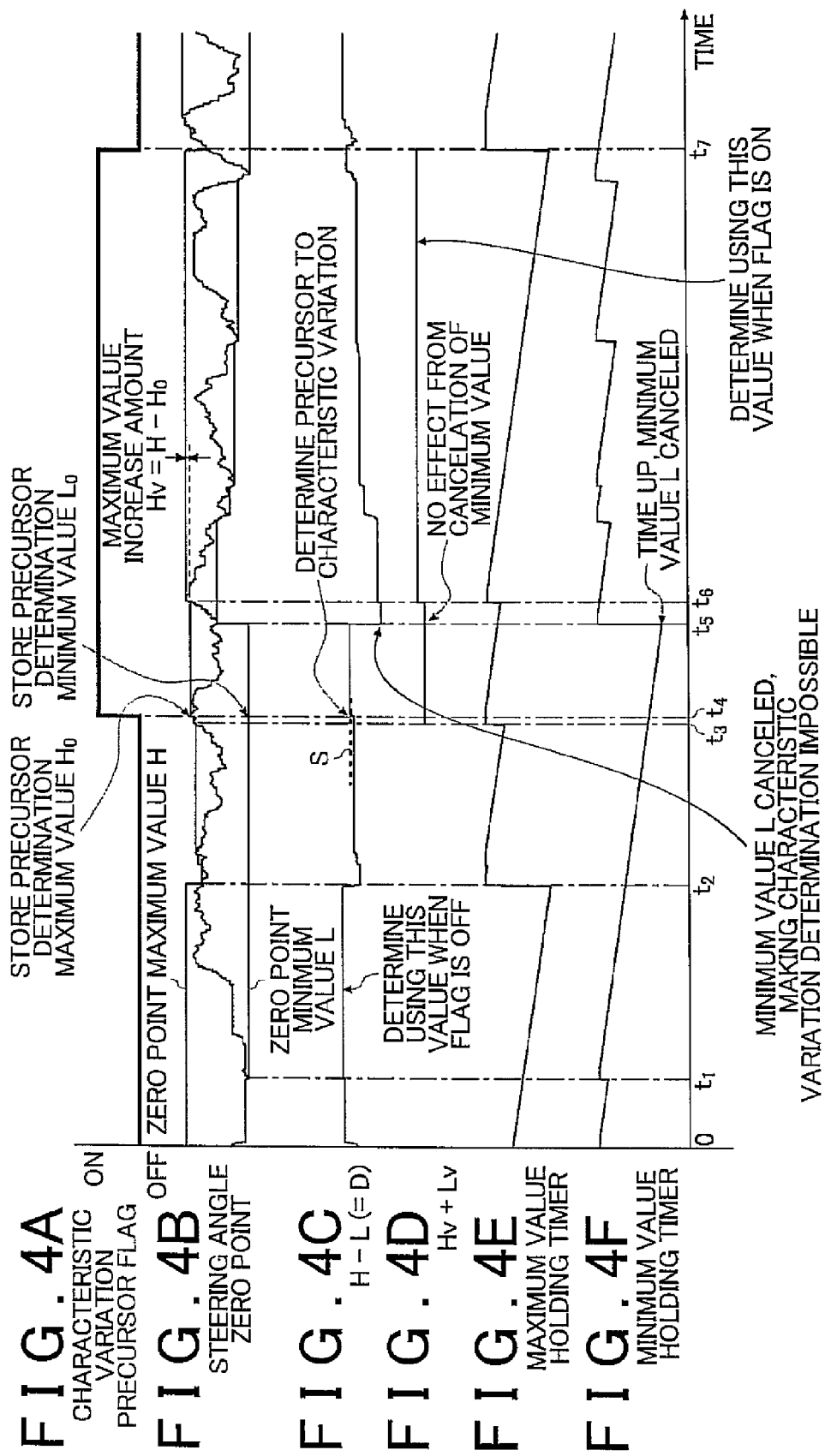

STEERING APPARATUS AND CONTROL METHOD THEREOF

INCORPORATION BY REFERENCE

The disclosure of Japanese Patent Application No. 2012-248721, filed on Nov. 12, 2012 including the specification, drawings and abstract is incorporated herein by reference in its entirety.

BACKGROUND OF THE INVENTION

1. Field of the Invention

The invention relates to a steering apparatus that detects a zero point of a steering angle of a steering wheel, and a control method thereof.

2. Description of Related Art

In a vehicle behavior control technique such as electronic stability control (available as vehicle stability control (VSC)), various types of control are executed using a detection value from a steering angle sensor attached to a steering wheel. When a type of steering angle sensor that outputs a relative angle is used, a zero point of the steering angle sensor is detected first, and then an absolute steering angle is calculated on the basis of the detected zero point. For this purpose, the steering angle zero point needs to be detected with a high degree of precision. Japanese Patent Application Publication No. 2004-276734 (JP 2004-276734 A), for example, describes a technique of detecting the steering angle zero point on the basis of a difference between an estimated yaw rate estimated from the detection value of the steering angle sensor and an actual yaw rate detected by a yaw rate sensor.

As a result, precision with which the steering angle zero point is detected may also decrease.

SUMMARY OF THE INVENTION

The invention provides a steering apparatus capable of determining with a high degree of precision whether or not characteristic variation has occurred in a steering transmission system, and a control method thereof.

A first aspect of the invention is a steering apparatus including: a steering angle zero point detection unit configured to detect a zero point of a steering angle of a steering wheel; a history holding unit configured to record a maximum value and a minimum value of the zero point of the steering angle as a zero point maximum value and a zero point minimum value, cancel the recorded zero point maximum value when a predetermined period elapses following updating of the zero point maximum value, and cancel the recorded zero point minimum value when the predetermined period elapses following updating of the zero point minimum value; a characteristic variation determination unit configured to determine that characteristic variation has occurred in a steering transmission system when a difference between the zero point maximum value and the zero point minimum value exceeds a first threshold within the predetermined period; and a precursor determination unit configured to determine that the steering transmission system is in a precursory condition to characteristic variation when the difference between the zero point maximum value and the zero point minimum value exceeds a second threshold, which is smaller than the first threshold, within the predetermined period, wherein, when the steering transmission system is determined by the precursor determination unit to be in the precursory condition to characteristic variation, the characteristic variation determination unit is configured to determine whether or not characteristic variation has occurred in the steering transmission system on the basis of at least one of an amount of increase in the zero point maximum value and an amount of decrease in the zero point minimum value following a point at which the steering transmission system is determined to be in the precursory condition to characteristic variation.

A second aspect of the invention is a steering apparatus control method including: detecting a zero point of a steering angle of a steering wheel; recording a maximum value and a minimum value of the zero point of the steering angle as a zero point maximum value and a zero point minimum value; canceling the recorded zero point maximum value when a predetermined period elapses following updating of the zero point maximum value, and canceling the recorded zero point minimum value when the predetermined period elapses following updating of the zero point minimum value; determining that characteristic variation has occurred in a steering transmission system when a difference between the zero point maximum value and the zero point minimum value exceeds a first threshold within the predetermined period; determining that the steering transmission system is in a precursory condition to characteristic variation when the difference between the zero point maximum value and the zero point minimum value exceeds a second threshold, which is smaller than the first threshold, within the predetermined period; and determining, when the steering transmission system is determined to be in the precursory condition to characteristic variation, whether or not characteristic variation has occurred in the steering transmission system on the basis of at least one of an amount of increase in the zero point maximum value and an amount of decrease in the zero point minimum value following a point at which the steering transmission system is determined to be in the precursory condition to characteristic variation.

According to the invention, the determination as to whether or not characteristic variation has occurred in the steering transmission system can be made with a high degree of precision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 4A to 4F are graphs illustrating an example of a characteristic variation precursor determination according to this embodiment;

DETAILED DESCRIPTION OF EMBODIMENTS

Figure 1:
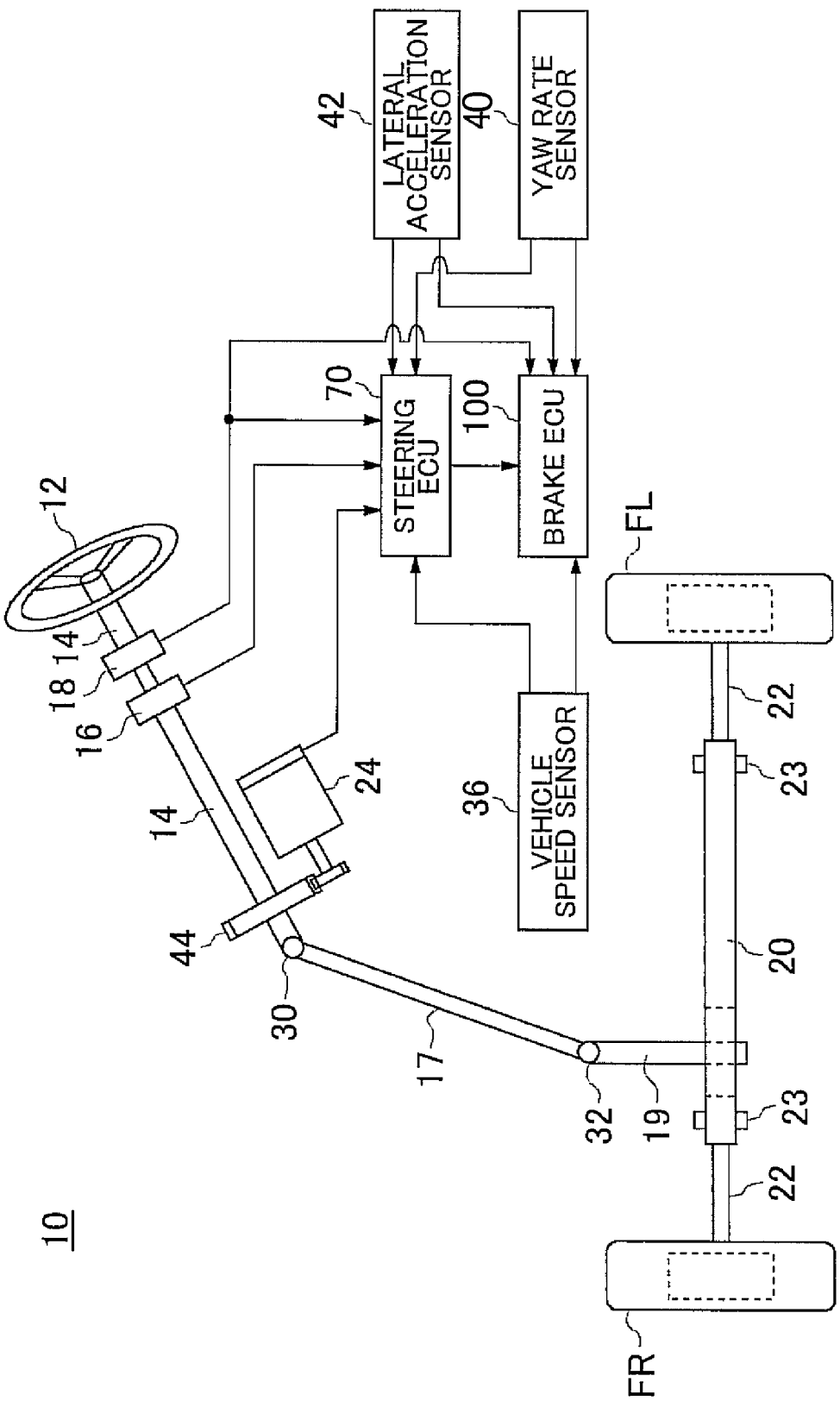
FIG. 1 is a schematic view showing a configuration of a vehicle that includes a steering apparatus according to an embodiment of the invention.

FIG. 1 is a schematic view showing a configuration of a vehicle that includes a steering apparatus 10 according to an embodiment of the invention. FIG. 1 is a schematic view showing a front wheel part of a four-wheel vehicle. An advancement direction of the vehicle is modified by steering a right front wheel FR and a left front wheel FL serving as steered wheels.

The steering apparatus 10 includes an electric power steering (referred to hereafter as an "EPS") device. The EPS includes a steering wheel 12 steered by a driver, a steering shaft 14 coupled to the steering wheel 12, a speed reduction mechanism 44 provided on a lower end of the steering shaft, and a steering assist motor 24 connected to the speed reduction mechanism 44 by an output shaft thereof. The steering assist motor 24 applies an assist force for assisting a steering operation by driving the steering shaft 14 to rotate.

A torsion bar, not shown in the drawing, a steering torque sensor 16 that detects torque generated in the torsion bar, and a steering angle sensor 18 that detects a steering angle of the steering wheel 12 are disposed on the steering shaft 14. Outputs from the respective sensors are transmitted to a steering ECU 70 and a brake ECU 100.

The steering shaft 14 is coupled to an intermediate shaft 17 and a pinion shaft 19 via universal joints 30, 32. The pinion shaft 19 is provided to extend in a left-right direction of the vehicle (a vehicle width direction), and coupled to a steering gearbox 20 including a rack bar 22 that slides in an axial direction thereof. The intermediate shaft 17 includes a rubber coupling as a part thereof.

The steering gearbox 20 is constructed by meshing a pinion gear formed on one end of the pinion shaft 19 to a rack shaft. Further, the steering gearbox 20 is supported on a vehicle body via a rubber grommet 23.

When the driver operates the steering wheel 12, rotation of the steering shaft 14 is transmitted to the steering gearbox 20 via the shafts 17, 19, and is converted by the steering gearbox 20 into a left-right direction linear motion of the rack bar 22. One end of a tie rod (not shown) is connected to each end of the rack bar 22. The other ends of the respective tie rods are coupled to knuckle arms (not shown) that respectively support the right front wheel FR and the left front wheel FL. The right front wheel FR and the left front wheel FL are steered by the linear motion of the rack bar 22.

A vehicle speed sensor 36 that outputs a vehicle speed by detecting a rotation speed of the vehicle wheel is attached to the vicinity of the vehicle wheel. Instead of using the vehicle speed sensor 36, the vehicle speed may be determined using data from a global positioning system (GPS), not shown in the drawing. A lateral acceleration sensor 42 that detects acceleration of the vehicle body in the left-right direction is also provided on the vehicle body. Detection values from these sensors are transmitted to the brake ECU 100.

The steering ECU 70 calculates a steering torque assist value on the basis of the detection values received from the respective sensors, and outputs a corresponding control signal to the steering assist motor 24. Note that the steering mechanism itself, including the EPS described above, is a conventional mechanism, and therefore further detailed description thereof has been omitted from this specification.

To reduce vibration of the steering wheel, regulate a steering feeling, secure compliance steer, and so on, various components of a steering transmission system from the steering wheel to the vehicle wheel are often supported on the vehicle body via elastic members such as rubber grommets, rubber couplings, and rubber bushes. When transmission characteristic variation such as loosening occurs in the steering transmission system due to deterioration of these elastic members over time, linearity is no longer maintained between the steering angle and a tire angle, leading to variation in the steering feeling and a reduction in a precision with which vehicle state quantities based on steering angle information are estimated.

In this embodiment, therefore, as will be described in detail below, when characteristic variation in the elastic members of the steering transmission system is determined to have occurred on the basis of a detection history of a steering angle zero point during vehicle travel, either the driver of the vehicle is notified of this fact or an instruction is issued to stop executing various types of vehicle control that use the steering angle.

Figure 2:
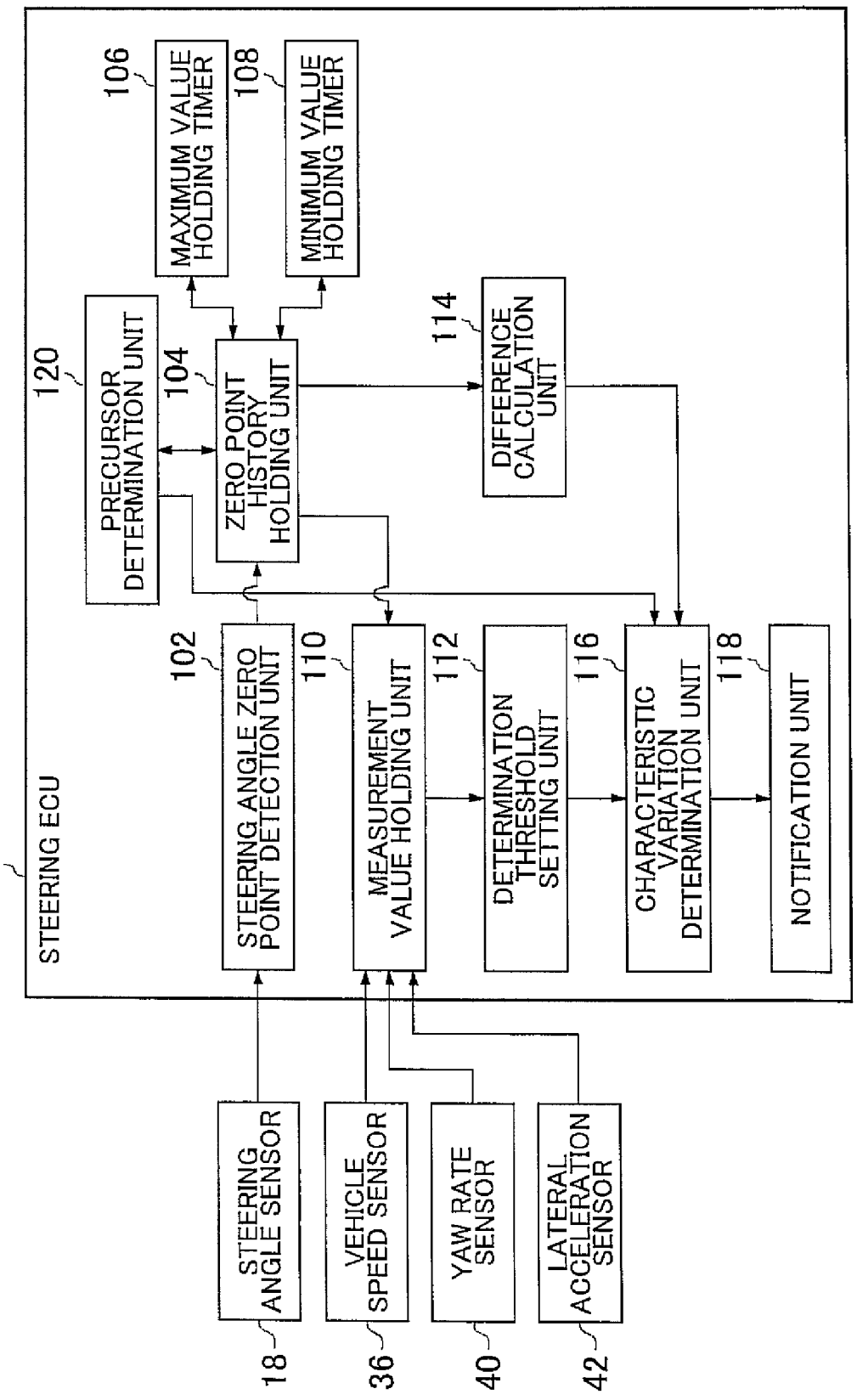
FIG. 2 is a function block diagram showing a configuration of a part of a steering electronic control unit (steering ECU) for steering contributing to the detection of characteristic variation in a steering transmission system according to this embodiment.

FIG. 2 is a function block diagram showing a configuration of a part of the steering ECU 70 that contributes to a characteristic variation determination made in relation to the steering transmission system according to this embodiment. Respective blocks shown in the drawing may be realized in hardware form by elements and electric circuits of a central processing unit (CPU) and a memory of a computer, or in software form by a computer program or the like. Here, however, the respective blocks are depicted as interlinked function blocks. Persons skilled in the art will therefore understand that the function blocks can be realized in various forms by combinations of hardware and software.

A steering angle zero point detection unit 102 detects a zero point (a neutral point) of the steering angle sensor 18 using a desired conventional method. A steering wheel absolute steering angle is calculated on the basis of the detected zero point, and used in various types of vehicle control.

A zero point history holding unit 104 records most recently updated maximum and minimum values of the zero point detected by the steering angle zero point detection unit 102. An operation of the zero point history holding unit 104 will be described in detail below with reference to flowcharts shown in FIGS. 5 to 7.

A maximum value holding timer 106 and a minimum value holding timer 108 are connected to the zero point history holding unit 104. These timers are countdown timers for counting the elapse of time following storage of the zero point maximum value and the zero point minimum value in the zero point history holding unit 104. When a count value of the maximum value holding timer 106 or the minimum value holding timer 108 reaches a predetermined value, the zero point history holding unit 104 cancels the zero point maximum value or the zero point minimum value stored at that point. This operation will be described in detail below with reference to FIG. 3.

A measurement value holding unit 110 receives detection values respectively from the vehicle speed sensor 36, a yaw rate sensor 40, and the lateral acceleration sensor 42, and records the vehicle speed, a yaw rate, and the lateral acceleration at the time of updating of the zero point maximum value or the zero point minimum value by the zero point history holding unit 104.

A determination threshold setting unit 112 calculates a characteristic variation determination threshold $T_1$ for determining the occurrence of characteristic variation in the steering transmission system, or more specifically loosening caused by deterioration of the elastic members such as rubber bushes, using the vehicle speed, yaw rate, and lateral acceleration recorded in the measurement value holding unit 110.

The characteristic variation determination threshold $T_1$ is set in consideration of respective errors in the vehicle speed sensor, the yaw rate sensor, the lateral acceleration sensor, and the steering angle sensor, processing variation in the respective components, and assembly variation in the vehicle, as will be described in detail below. Alternatively, a zero point detection history of a normal vehicle may be obtained, and the characteristic variation determination threshold may be set at a value greatly exceeding a zero point detection result obtained from the normal vehicle (a value twice as large as the zero point detection result or the like, for example).

A difference calculation unit 114 calculates a difference D between a zero point maximum value H and a zero point minimum value L recorded in the zero point history holding unit 104.

A characteristic variation determination unit 116 determines whether or not the difference D calculated by the difference calculation unit 114 exceeds the characteristic variation determination threshold $T_1$. When the difference D exceeds the characteristic variation determination threshold $T_1$, it is determined that characteristic variation has occurred in the steering transmission system.

When the characteristic variation determination unit 116 determines that characteristic variation has occurred, a notification unit 118 either notifies the driver of the vehicle of this fact or instructs a vehicle control ECU, not shown in the drawing, to stop executing the various types of vehicle control that use the steering angle.

Figure 3:
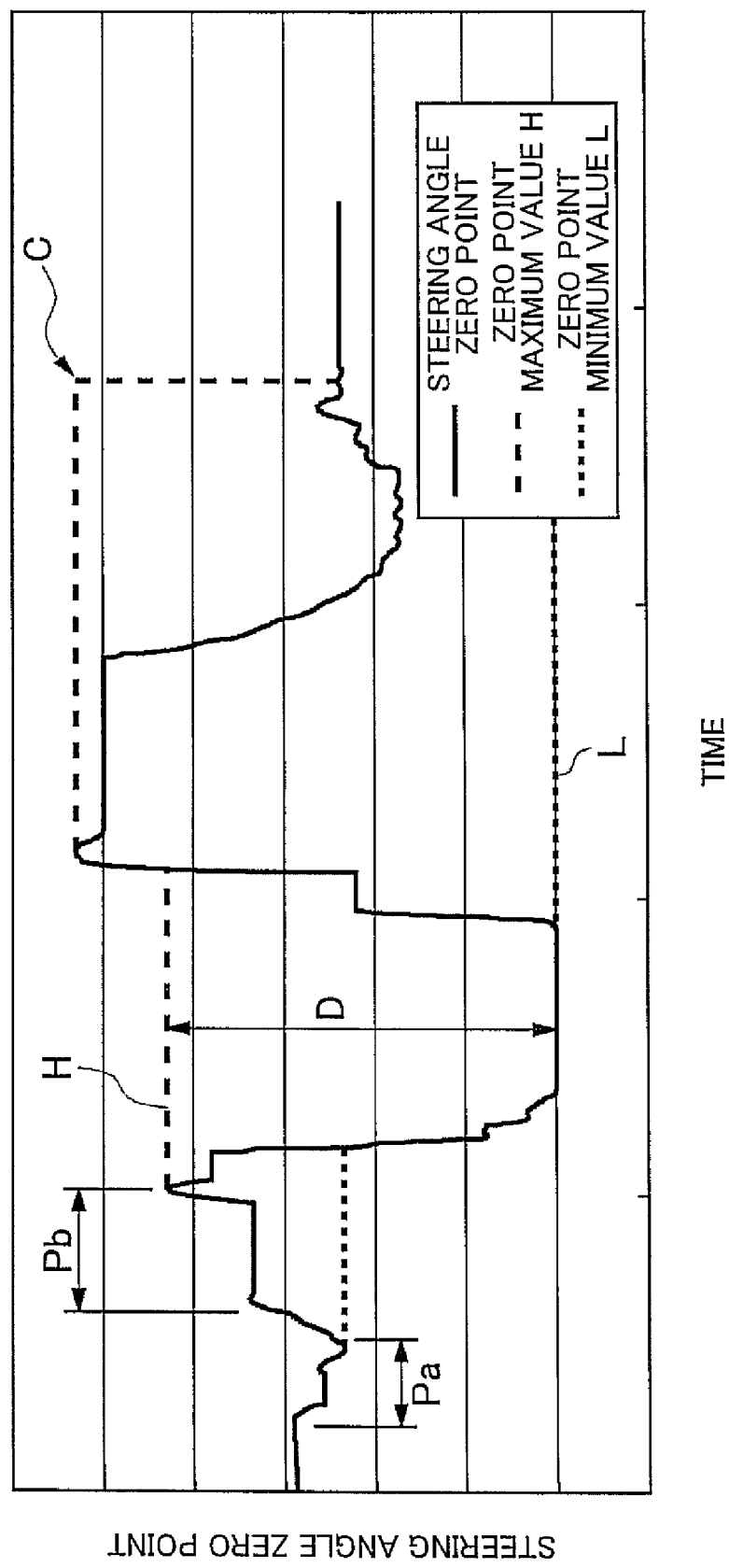
FIG. 3 is a graph showing an example of histories of a zero point maximum value and a zero point minimum value.

Next, using FIG. 3, a method employed by the steering ECU 70 to determine the occurrence of characteristic variation in the steering transmission system will be described. FIG. 3 is a graph showing an example of histories of the zero point maximum value H and the zero point minimum value L.

The abscissa of FIG. 3 shows elapsed time, and the ordinate shows a detected steering angle zero point θ. It is assumed in the following description that at a time 0, the zero point maximum value and the zero point minimum value are reset to a current steering angle zero point detection value (an initial value).

In a period Pa shown in the drawing, the steering angle zero point detection value falls below the initial value of the zero point minimum value, and therefore the zero point history holding unit 104 updates the zero point minimum value L. Further, in a period Pb, the steering angle zero point detection value exceeds the initial value of the zero point maximum value, and therefore the zero point history holding unit 104 updates the zero point maximum value H. Thereafter, the zero point maximum value and the zero point minimum value are updated every time the steering angle zero point detection value exceeds the held zero point maximum value or falls below the held zero point minimum value.

The difference calculation unit 114 calculates the difference D between the zero point maximum value H and the zero point minimum value L. The characteristic variation determination unit 116 compares the difference D with the characteristic variation determination threshold $T_1$ set by the determination threshold setting unit 112, and when the difference D exceeds the threshold $T_1$, determines that characteristic variation (i.e. deterioration of the elastic members) has occurred in the steering transmission system. This determination is based on the fact that when loosening occurs due to deterioration of the elastic members in the steering transmission system, the steering angle zero point detection value is likely to vary greatly during a steering wheel operation.

The maximum value holding timer 106 and the minimum value holding timer 108 count the elapsed time following the latest respective updates of the zero point maximum value H and the zero point minimum value L. When a predetermined time elapses, the zero point history holding unit 104 resets the zero point maximum value H or the zero point minimum value L to the current steering angle zero point detection value. In FIG. 3, variation in the zero point maximum value at a point C corresponds to this processing.

The reason for performing this processing is as follows. The zero point of an analog sensor such as the yaw rate sensor 40 or the lateral acceleration sensor 42 may vary due to temperature variation. When the zero points of the respective sensors vary due to variation in the temperature inside a vehicle cabin, the steering angle zero point detection value also varies, making it difficult to determine whether the difference D in the steering angle zero point is due to characteristic variation in the steering transmission system or due to temperature variation. Hence, by canceling the zero point maximum value and the zero point minimum value respectively, every time the predetermined time elapses following the previous update, under the presumption that large temperature variation in the vehicle cabin cannot occur within a short time period, the effect of temperature variation in the various sensors on the characteristic variation determination is eliminated.

As described above, however, the maximum value holding timer and the minimum value holding timer operate independently of each other, and therefore the zero point maximum value and the zero point minimum value may be canceled at different timings. The determination as to whether or not characteristic variation has occurred in the steering transmission system is performed on the basis of the difference between the zero point maximum value and the zero point minimum value, and therefore, at a point where one of the zero point maximum value and the zero point minimum value is canceled, the difference between the zero point maximum value and the zero point minimum value decreases in value, making it difficult to determine the occurrence of characteristic variation accurately. In other words, when one of the zero point maximum value and the zero point minimum value is canceled in a situation where the difference between the zero point maximum value and the zero point minimum value is gradually increasing such that the occurrence of characteristic variation in the steering transmission system will soon be determined, the characteristic variation determination must be restarted. As a result, the determination as to the occurrence of characteristic variation in the steering transmission system may be performed less frequently, leading to a reduction in the precision of the characteristic variation determination.

Hence, in this embodiment, in a condition (a precursory condition) where the difference between the zero point maximum value and the zero point minimum value is increasing such that the presence of characteristic variation in the steering transmission system is likely to be determined soon, the characteristic variation determination is performed on the basis of an amount of increase in the zero point maximum value (the zero point maximum value increase amount) and an amount of decrease in the zero point minimum value (the zero point minimum value decrease amount) following the point at which the precursor to characteristic variation is determined to be present.

FIGS. 4A to 4F are graphs illustrating an example of a characteristic variation precursor determination according to this embodiment.

FIG. 4A shows an ON/OFF condition of a characteristic variation precursor flag. FIG. 4B, similarly to FIG. 3, shows the value of the steering angle zero point detected by the steering angle zero point detection unit 102, and the zero point maximum value H and zero point minimum value L recorded in the zero point history holding unit 104. FIG. 4C shows the difference D=H−L between the zero point maximum value H and the zero point minimum value L. FIG. 4D shows a sum (Hv+Lv) of the zero point maximum value increase amount Hv and the zero point minimum value decrease amount Lv, to be described below. FIG. 4E shows a count value of the maximum value holding timer. FIG. 4F shows a count value of the minimum value holding timer.

While the characteristic variation precursor flag is OFF (0 to $t_4$), the characteristic variation determination unit 116 determines whether or not characteristic variation has occurred in the steering transmission system by comparing the difference D between the zero point maximum value H and the zero point minimum value L with the characteristic variation determination threshold $T_1$, similarly to the example of FIG. 3. Meanwhile, the precursor determination unit 120 determines whether or not the difference D exceeds a precursor determination threshold S. The precursor determination threshold S is used to detect the precursory condition to characteristic variation, in which the difference D is gradually increasing such that the likelihood of the difference D eventually exceeding the characteristic variation determination threshold $T_1$ is believed to be high, and is set at approximately 80% of the threshold $T_1$, for example (S=0.8× $T_1$). The zero point history holding unit 104 stores the zero point maximum value H and the zero point minimum value L at the point where the steering transmission system is determined to be in the precursory condition to characteristic variation as a precursor determination zero point maximum value $H_0$ and a precursor determination zero point maximum value $L_0$, respectively.

In the example of FIGS. 4A to 4F, the zero point maximum value is updated at a time $t_3$, and as a result, the difference D exceeds the precursor determination threshold S at a time $t_4$, whereby the characteristic variation precursor flag is switched ON.

While the characteristic variation precursor flag is ON, the characteristic variation determination using the comparison between the difference D and the characteristic variation determination threshold $T_1$ is not performed. Instead, the characteristic variation determination unit 116 executes the characteristic variation determination using the zero point maximum value increase amount Hv, which is an amount of increase in the current zero point maximum value H with respect to the precursor determination zero point maximum value $H_0$, and the zero point minimum value decrease amount Lv, which is an amount of decrease in the current zero point minimum value L with respect to the precursor determination zero point maximum value $L_0$. More specifically, the characteristic variation determination unit 116 determines whether or not a sum of the zero point maximum value increase amount Hv and the zero point minimum value decrease amount Lv exceeds a second characteristic variation determination threshold $T_2$ (Hv+Lv>$T_2$). The second characteristic variation determination threshold $T_2$ is set at $T_2=T_1-S$, for example.

This processing corresponds to determining that characteristic variation has occurred in the steering transmission system when a sum of the precursor determination threshold and at least one of the amount of increase in the zero point maximum value and the amount of decrease in the zero point minimum value after the steering transmission system is determined to be in the precursory condition to characteristic variation exceeds the first characteristic variation determination threshold $T_1$. It may be said that by performing this processing, an effective period of variation in the detected steering angle zero point prior to the precursor determination is extended.

Hence, while the characteristic variation precursor flag is ON, the determination as to the presence of characteristic variation in the steering transmission system can still be performed even when the count value of the maximum value holding timer or the minimum value holding timer reaches zero such that the zero point maximum value or the zero point minimum value is canceled. In the example of FIGS. 4A to 4F, the zero point minimum value L is canceled when the count value of the minimum value holding timer reaches zero at a time $t_5$, for example, but as shown in FIG. 4D, the value of (Hv+Lv) does not change, and therefore the characteristic variation determination is unaffected.

According to this embodiment, as described above, the period in which the presence of characteristic variation in the steering transmission system can be determined is extended, and therefore the characteristic variation determination is performed with greater frequency, leading to an improvement in the precision of the characteristic variation determination.

Figure 5A:
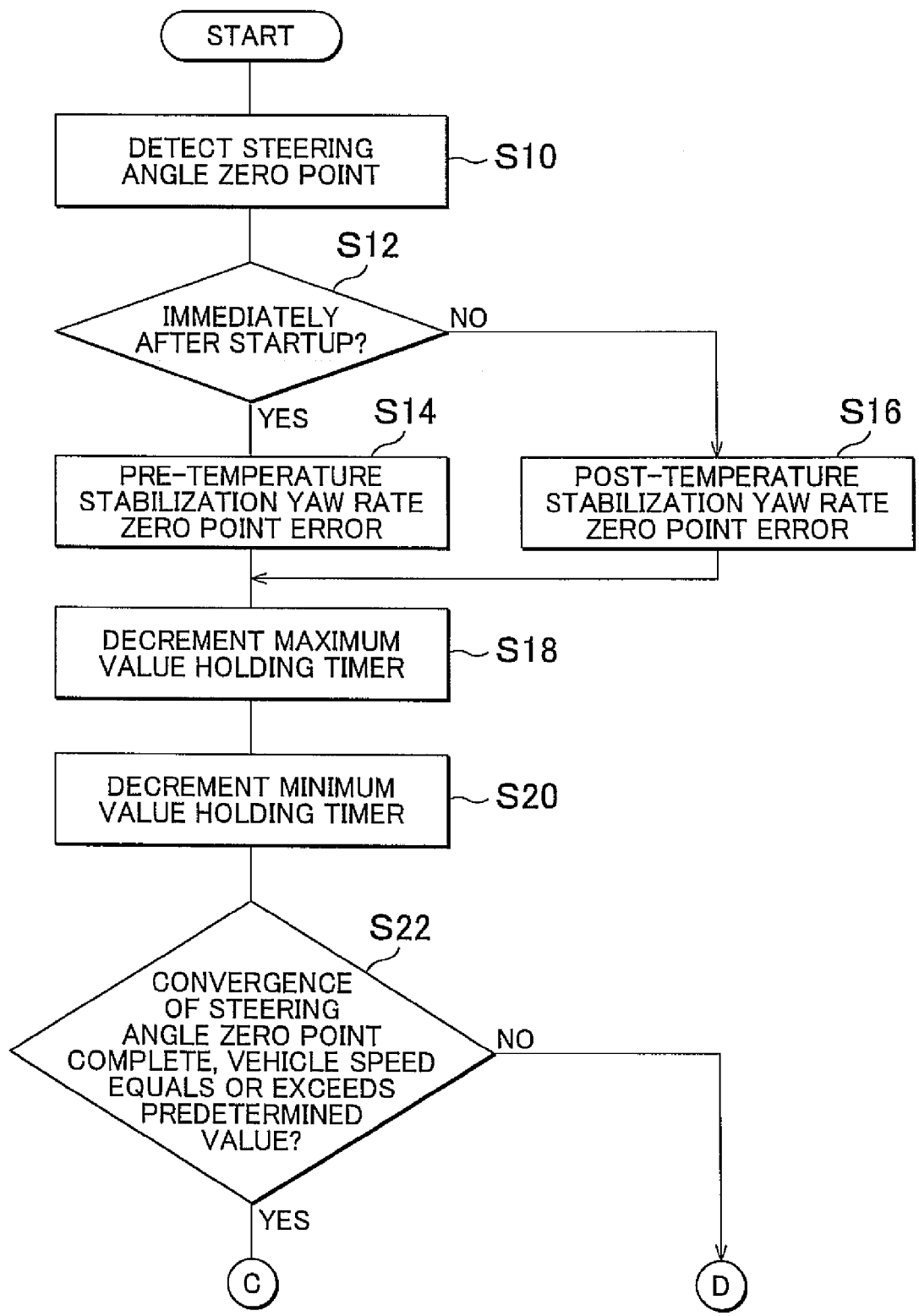
FIGS. 5A and 5B are flowcharts illustrating characteristic variation detection according to this embodiment.
Figure 5B:
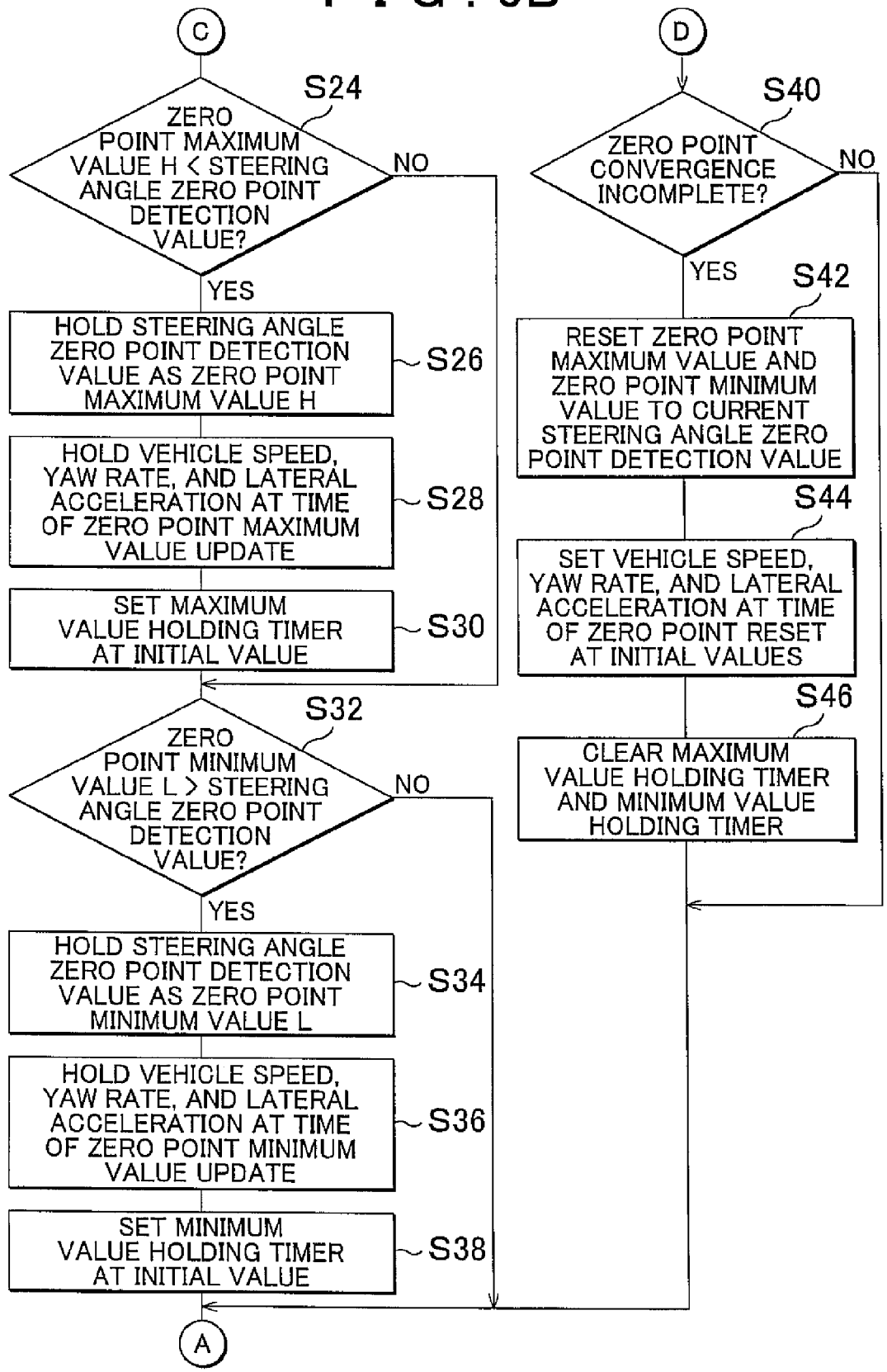
Figure 6:
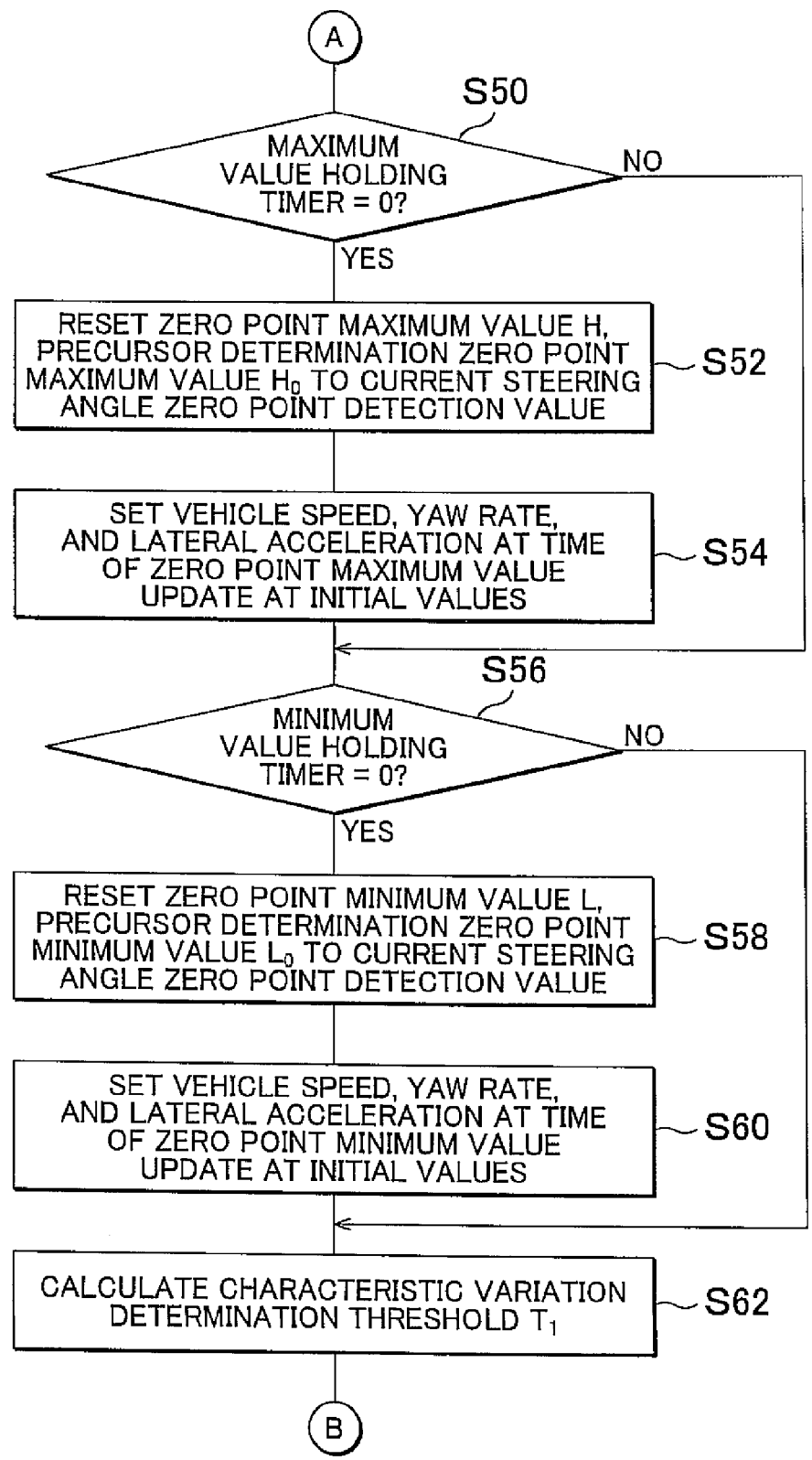
FIG. 6 is a flowchart illustrating the characteristic variation detection according to this embodiment.

FIGS. 5 to 7 are flow charts illustrating detection of characteristic variation in the steering transmission system according to this embodiment. This flow is executed repeatedly at predetermined intervals (one second intervals, for example) during vehicle travel.

First, referring to FIGS. 5A and 5B, the steering angle zero point detection unit 102 detects the steering angle zero point θ of the steering wheel on the basis of the detection value obtained by the steering angle sensor 18 (S10). The determination threshold setting unit 112 determines whether or not a current time is immediately after startup of the vehicle (S12). When the current time is immediately after startup of the vehicle (Y in S12), the temperature of the yaw rate sensor 40 is assumed to be unstable, and therefore a pre-temperature stabilization yaw rate zero point error is selected (S14). When the current time is not immediately after startup (N in S12), the temperature of the yaw rate sensor 40 is assumed to be stable, and therefore a post-temperature stabilization yaw rate zero point error is selected (S16).

Next, the zero point history holding unit 104 decrements the maximum value holding timer 106 and the minimum value holding timer 108 (S18, S20). Note that the initial values of these timers are set in steps S30 and S38, to be described below, but immediately after a startup, the initial values are not set, and therefore a lower limit guard value is set in advance at zero.

The determination threshold setting unit 112 determines whether or not convergence of the steering angle zero point is complete and whether or not the vehicle speed equals or exceeds a predetermined value (S22). When the vehicle speed is low, errors caused by component variation, sensor tolerance, and so on tend to be larger than when the vehicle speed is high, and therefore the likelihood of an erroneous determination of the occurrence of characteristic variation increases. At a low speed (lower than 30 km/h, for example), therefore, the determination as to the occurrence of characteristic variation in the steering transmission system is not executed.

When the vehicle speed is lower than the predetermined value (N in S22), a determination is made as to whether or not convergence of the steering angle zero point is incomplete (S40). During an initial determination, convergence of the steering angle zero point is not complete (Y in S40), and therefore the processing advances to S42, where the zero point history holding unit 104 resets the stored zero point maximum value and zero point minimum value to the current steering angle zero point detection value (S42). In response, the measurement value holding unit 110 stores the vehicle speed, yaw rate, and lateral acceleration at the time of the reset as initial values (S44). The zero point history holding unit 104 then clears the maximum value holding timer 106 and the minimum value holding timer 108 (S46). When, in S40, convergence of the steering angle zero point is complete (N in S40), S42 to S46 are skipped.

When, in S22, convergence of the steering angle zero point is complete and the vehicle speed equals or exceeds the predetermined value (Y in S22), the zero point history holding unit 104 determines whether or not the current steering angle zero point detection value is larger than the stored zero point maximum value H, or in other words whether or not it is necessary to update the zero point maximum value (S24). When the steering angle zero point detection value is equal to or smaller than the zero point maximum value H (N in S24), S26 to S30 are skipped. When the steering angle zero point detection value is larger than the zero point maximum value H (Y in S24), the zero point history holding unit 104 stores the steering angle zero point detection value as the new zero point maximum value H (S26), and the measurement value holding unit 110 stores the vehicle speed, yaw rate, and lateral acceleration at the time of the maximum value update (S28). The maximum value holding timer 106 is set at a predetermined initial value (180 seconds, for example) (S30).

Next, the zero point history holding unit 104 determines whether or not the current steering angle zero point detection value is smaller than the stored zero point minimum value L, or in other words whether or not it is necessary to update the zero point minimum value (S32). When the steering angle zero point detection value equals or exceeds the zero point minimum value L (N in S32), S34 to S38 are skipped. When the steering angle zero point detection value is smaller than the zero point minimum value L (Y in S32), the zero point history holding unit 104 stores the steering angle zero point detection value as the new zero point minimum value L (S34), and the measurement value holding unit 110 stores the vehicle speed, yaw rate, and lateral acceleration at the time of the minimum value update (S36). The minimum value holding timer 108 is set at a predetermined initial value (S38).

Next, referring to FIG. 6, the zero point history holding unit 104 determines whether or not the count value of the maximum value holding timer is zero (S50). When the count value is zero (Y in S50), the zero point history holding unit 104 resets the zero point maximum value H and the precursor determination zero point maximum value $H_0$ (stored in S68, to be described below) to the current steering angle zero point detection value (S52), and the measurement value holding unit 110 resets the vehicle speed, yaw rate, and lateral acceleration held at the time of the maximum value update to the initial values (S54).

Further, the zero point history holding unit 104 determines whether or not the count value of the minimum value holding timer is zero (S56). When the count value is zero (Y in S56), the zero point history holding unit 104 resets the zero point minimum value L and the precursor determination zero point minimum value $L_0$ (stored in S68, to be described below) to the current steering angle zero point detection value (S58), and the measurement value holding unit 110 resets the vehicle speed, yaw rate, and lateral acceleration held at the time of the minimum value update to the initial values (S60).

The processing of S50 to S60 corresponds to zero point maximum value and minimum value resetting processing performed to minimize the effect of variation in the zero point of the steering angle sensor due to temperature variation.

Next, the determination threshold setting unit 112 calculates the characteristic variation determination threshold $T_1$ on the basis of a following equation (S62).

$$T_1 = \{(\theta \times V)/(n \times L) - Kh \times Gy \times V - YR\} \times n \times L \times (1/V) = \theta - Kh \times Gy/n \times L - YR \times n \times L \times (i/V) \quad (1)$$

Here, θ is the steering angle detection value, V is the vehicle speed, Gy is the lateral acceleration, YR is the yaw rate, Kh is a stability factor, n is an overall steering gear ratio, and L is a wheel base.

In Equation (1), calculation of "$(\theta \times V)/(n \times L) - Kh \times Gy \times V$" corresponds to calculation of a target yaw rate. Accordingly, calculation of "$\{(\theta \times V)/(n \times L) - Kh \times Gy \times V - YR\} \times n \times L \times (1/V)$" corresponds to determination of a steering angle conversion value of a value obtained by subtracting an actual yaw rate from the target yaw rate.

Equation (1) corresponds to a sum of (i) a steering angle error caused by a zero point/gain error in the steering angle sensor and a zero point error in the lateral acceleration sensor, (ii) a steering angle error caused by a gain error in the lateral acceleration sensor and individual differences among vehicles, (iii) a steering angle error caused by a zero point error in the yaw rate sensor, and (iv) a steering angle error caused by gain errors in the yaw rate sensor and the vehicle speed sensor.

Note that as the vehicle speed, yaw rate, and lateral acceleration to be substituted into Equation (1), the smaller vehicle speed and the larger yaw rate and acceleration are preferably selected from the values stored in the measurement value holding unit 110 (i.e. the value stored at the time of the zero point maximum value update and the value stored at the time of the zero point minimum value update). The reason for this is that the steering angle error tends to be larger at low speeds than at high speeds, and therefore, when a large steering angle error calculated during low speed travel is compared with a small characteristic variation determination threshold $T_1$ calculated during high speed travel, the occurrence of characteristic variation may be determined erroneously. To avoid this situation, the above values are preferably selected.

Figure 7A:
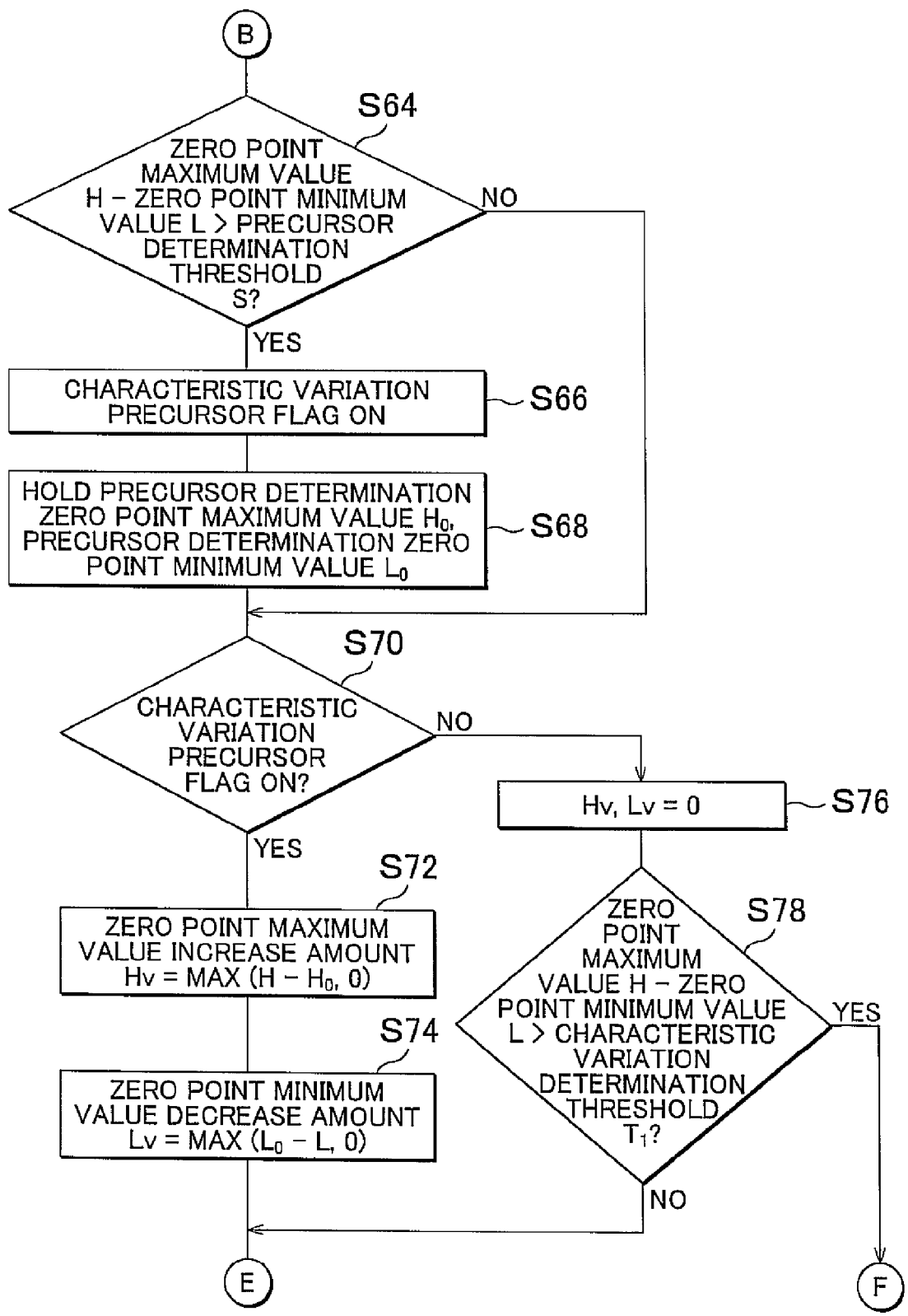
FIGS. 7A and 7B are flowcharts illustrating the characteristic variation detection according to this embodiment.
Figure 7B:
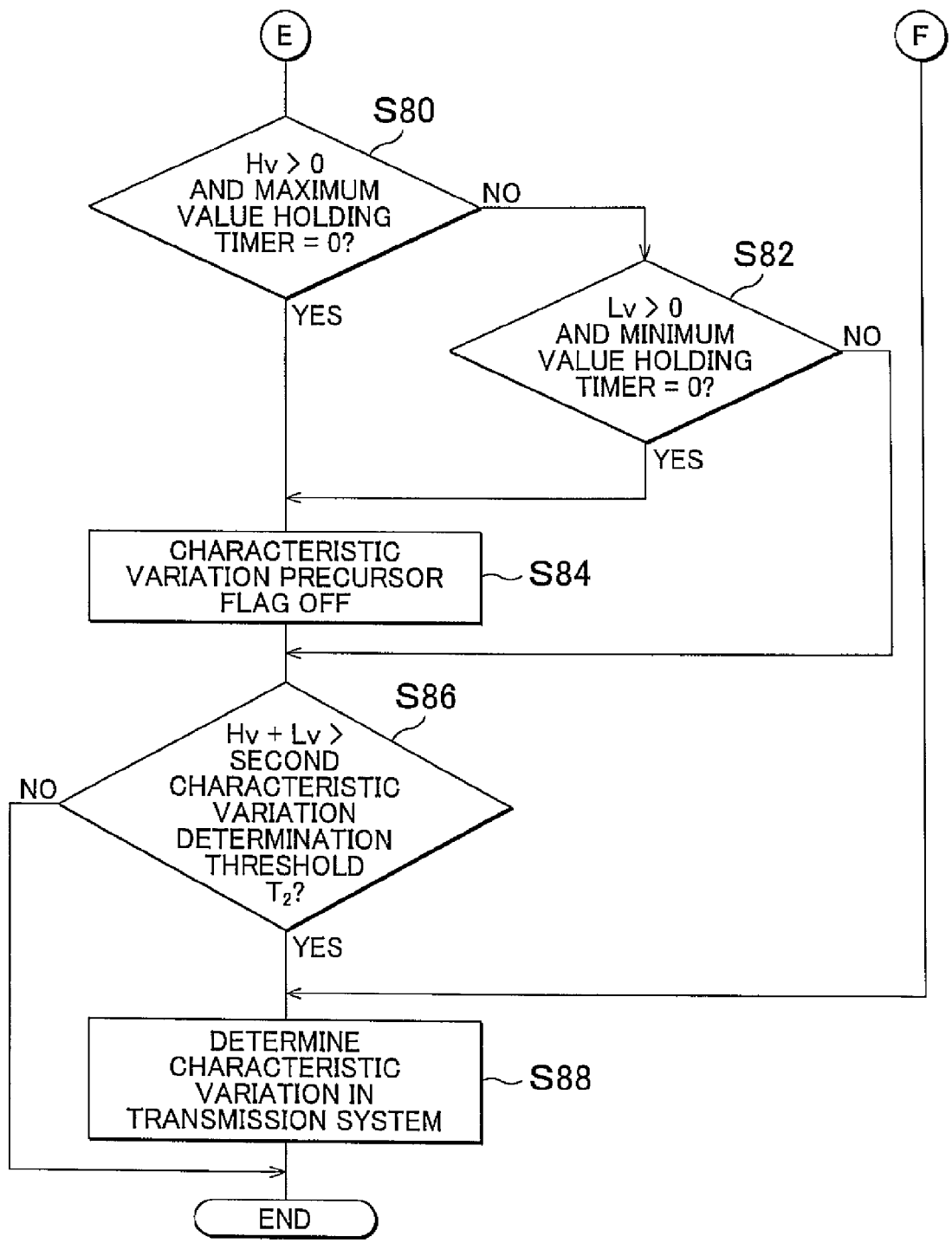

Next, referring to FIGS. 7A and 7B, the zero point history holding unit 104 determines whether or not the difference between the zero point maximum value H and the zero point minimum value L exceeds the precursor determination threshold S (H−L>S) (S64). When the difference between the zero point maximum value H and the zero point minimum value L exceeds the precursor determination threshold S (Y in S64), it is assumed that the precursor to characteristic variation is present in the steering transmission system, and therefore the characteristic variation precursor flag is switched ON (S66), whereupon the zero point maximum value and the zero point minimum value at this time are stored respectively as the precursor determination zero point maximum value $H_0$ and the precursor determination zero point minimum value $L_0$ (S68). When, in S64, the difference between the zero point maximum value H and the zero point minimum value L is equal to or smaller than the precursor determination threshold S (N in S64), S66 and S68 are skipped.

The precursor determination unit 120 determines whether or not the characteristic variation precursor flag is ON (S70). When the characteristic variation precursor flag is ON (Y in S70), the precursor determination unit 120 calculates MAX ($H-H_0$, 0) as the amount of increase Hv in the zero point maximum value following determination of the presence of the precursor to characteristic variation, or more specifically as the amount of increase Hv in the current zero point maximum value H with respect to the precursor determination zero point maximum value $H_0$ (S72). Further, the precursor determination unit 120 calculates MAX ($L_0-L$, 0) as the amount of decrease Lv in the zero point minimum value following determination of the presence of the precursor to characteristic variation, or more specifically as the amount of decrease Lv in the current zero point maximum value L with respect to the precursor determination zero point minimum value $L_0$ and (S74). The reason for determining in S72 and S74 whether or not "a value obtained by subtracting the precursor determination zero point maximum value $H_0$ from the current zero point maximum value H" and "a value obtained by subtracting the current zero point minimum value L from the precursor determination zero point minimum value $L_0$" are respectively larger than "0" is to ensure that Hv and Lv do not fall below zero.

The precursor determination unit 120 determines whether or not the zero point maximum value increase amount Hv is larger than zero and the count value of the maximum value holding timer is zero (S80). When at least one of these conditions, i.e. the zero point maximum value increase amount Hv being larger than zero and the count value of the maximum value holding timer being zero, is not established (N in S80), a determination is made as to whether or not the zero point minimum value decrease amount Lv is larger than zero and the count value of the minimum value holding timer is zero (S82). When one of the determination in S80 and the determination in S82 is affirmative, or in other words when a predetermined period has elapsed following determination of the presence of the precursor to characteristic variation (Y in S80, Y in S82), the characteristic variation precursor flag is switched OFF (S84). When both the determination in S80 and the determination in S82 are negative (N in S80 and N in S82), the characteristic variation determination unit 116 determines whether or not the sum of the zero point maximum value increase amount Hv and the zero point minimum value decrease amount Lv exceeds the second characteristic variation determination threshold $T_2$ (Hv+Lv>$T_2$) (S86). When the sum of the zero point maximum value increase amount Hv and the zero point minimum value decrease amount Lv exceeds the second characteristic variation determination threshold $T_2$ (Y in S86), the characteristic variation determination unit 116 determines that characteristic variation has occurred in the steering transmission system (S88), whereupon the notification unit 118 informs the driver thereof by lighting a predetermined lamp, using a buzzer, or the like, or instructs the vehicle control ECU to temporarily stop vehicle control based on detection of the steering angle zero point.

When, in S70, the characteristic variation precursor flag is OFF (N in S70), the zero point maximum value increase amount Hv and the zero point minimum value decrease amount Lv are canceled (S76). Next, the difference calculation unit 114 calculates the difference D=H−L between the zero point maximum value H and the zero point minimum value L, whereupon the characteristic variation determination unit 116 determines whether or not the difference D is larger than the characteristic variation determination threshold $T_1$ (D>$T_1$) (S78). When the difference D is larger than the characteristic variation determination threshold $T_1$ (Y in S78), the characteristic variation determination unit 116 determines that characteristic variation has occurred in the steering transmission system (S88), whereupon the notification unit 118 informs the driver thereof by lighting a predetermined lamp, using a buzzer, or the like, or instructs the vehicle control ECU to temporarily stop vehicle control based on detection of the steering angle zero point.

The processing of S78 is performed to determine whether or not a variation width of the steering angle zero point, or in other words the difference D between the zero point maximum value H and the zero point minimum value L, exceeds the characteristic variation determination threshold $T_1$, which is an accumulation of the zero point errors and gain errors in the steering angle sensor, the vehicle speed sensor, the lateral acceleration sensor, and the yaw rate sensor, and individual differences among vehicles. In other words, when the variation width of the steering angle zero point is larger than an imaginable accumulation of errors in the respective sensors, it is determined that the steering angle zero point has shifted due to loosening in the steering transmission system.

According to this embodiment, as described above, characteristic variation in the steering transmission system due to temporal deterioration of the elastic members that connect the respective components of the steering transmission system to the vehicle body and so on can be detected.

The invention was described above on the basis of embodiments. These embodiments are merely examples, and a person skilled in the art will understand that modified examples such as desired combinations of the embodiments and desired combinations of constituent elements and processes of the embodiments are also within the scope of the invention.

The invention is not limited to the embodiments described above, and various design modifications and other amendments may be added thereto on the basis of knowledge of persons skilled in the art. The configurations shown in the drawings are provided to illustrate examples, and may be modified appropriately as long as similar functions can be realized thereby.

In the embodiments, the steering ECU 70 determines whether or not characteristic variation has occurred in the steering transmission system, but the characteristic variation determination may be implemented by the brake ECU 100.

Several embodiments were described heretofore with reference to a vehicle that includes an electric power steering apparatus. However, the invention may also be applied to a vehicle that includes a hydraulic power steering apparatus. In this case, the vehicle does not include a steering ECU, and therefore the determination as to whether or not characteristic variation has occurred in the steering transmission system according to the invention is implemented by an ECU of a braking control device (vehicle stability control (VSC) or the like, for example) instead.

What is claimed is:

1. A steering apparatus comprising:
    a steering angle zero point detection unit configured to detect a zero point of a steering angle of a steering wheel;
    a history holding unit configured to record a maximum value and a minimum value of the zero point of the steering angle as a zero point maximum value and a zero point minimum value, cancel the recorded zero point maximum value and reset the recorded zero point maximum value when a predetermined period elapses following updating of the zero point maximum value, and cancel the recorded zero point minimum value and reset the recorded zero point minimum value when the predetermined period elapses following updating of the zero point minimum value;
    a characteristic variation determination unit configured to determine that characteristic variation has occurred in a steering transmission system when a difference between the zero point maximum value and the zero point minimum value exceeds a first threshold within the predetermined period; and
    a precursor determination unit configured to determine that the steering transmission system is in a precursory condition to characteristic variation when the difference between the zero point maximum value and the zero point minimum value exceeds a second threshold, which is smaller than the first threshold, within the predetermined period,
    wherein, when the steering transmission system is determined by the precursor determination unit to be in the precursory condition to characteristic variation, the characteristic variation determination unit is configured to determine whether or not characteristic variation has occurred in the steering transmission system on the basis of at least one of an amount of increase in the zero point maximum value and an amount of decrease in the zero point minimum value following a point at which the steering transmission system is determined to be in the precursory condition to characteristic variation.

2. The steering apparatus according to claim 1, wherein, in a case where the precursor determination unit has determined that the steering transmission system is in the precursory condition to characteristic variation, the characteristic variation determination unit is configured to determine that characteristic variation has occurred in a steering transmission system when a sum of the amount of increase in the zero point maximum value and the amount of decrease in the zero point minimum value exceeds a third threshold.

3. The steering apparatus according to claim 2, wherein the third threshold is equal to a difference between the first threshold and the second threshold.

4. A steering apparatus control method comprising:
   detecting a zero point of a steering angle of a steering wheel;
   recording a maximum value and a minimum value of the zero point of the steering angle as a zero point maximum value and a zero point minimum value;
   canceling the recorded zero point maximum value and resetting the recorded zero point maximum value when a predetermined period elapses following updating of the zero point maximum value, and
   canceling the recorded zero point minimum value and resetting the recorded zero point minimum value when the predetermined period elapses following updating of the zero point minimum value;
   determining that characteristic variation has occurred in a steering transmission system when a difference between the zero point maximum value and the zero point minimum value exceeds a first threshold within the predetermined period;
   determining that the steering transmission system is in a precursory condition to characteristic variation when the difference between the zero point maximum value and the zero point minimum value exceeds a second threshold, which is smaller than the first threshold, within the predetermined period; and
   determining, when the steering transmission system is determined to be in the precursory condition to characteristic variation, whether or not characteristic variation has occurred in the steering transmission system on the basis of at least one of an amount of increase in the zero point maximum value and an amount of decrease in the zero point minimum value following a point at which the steering transmission system is determined to be in the precursory condition to characteristic variation.

5. The steering apparatus according to claim 1, wherein when the history holding unit cancels the recorded zero point maximum value, the zero point history holding unit resets the zero point maximum value to a current zero point detection value as the zero point of the steering angle currently detected by the steering angle zero point detection unit, and when the history holding unit cancels the recorded zero point minimum value, the zero point history holding unit resets the zero point minimum value to a current zero point detection value as the zero point of the steering angle currently detected by the steering angle zero point detection unit.

6. The steering apparatus control method according to claim 4, further comprising:
   resetting the zero point maximum value to a currently detected zero point of the steering angle after canceling the recorded zero point maximum value; and
   resetting the zero point minimum value to a currently detected zero point of the steering angle after canceling the recorded zero point minimum value.

\* \* \* \* \*